United States Patent
Lombard et al.

(10) Patent No.: US 9,593,690 B2
(45) Date of Patent: Mar. 14, 2017

(54) TURBOCHARGER WITH AN ANNULAR ROTARY BYPASS VALVE

(71) Applicant: Honeywell International Inc., Morristown, NJ (US)

(72) Inventors: Alain Lombard, Vosges (FR); Andrew Love, Lorraine (FR); Antoine Costeux, Lorraine (FR)

(73) Assignee: Honeywell International Inc., Morris Plains, NJ (US)

( * ) Notice: Subject to any disclaimer, the term of this patent is extended or adjusted under 35 U.S.C. 154(b) by 892 days.

(21) Appl. No.: 13/927,399

(22) Filed: Jun. 26, 2013

(65) Prior Publication Data

US 2015/0004020 A1    Jan. 1, 2015

(51) Int. Cl.
| | | |
|---|---|---|
| F04D 25/00 | (2006.01) | |
| F04D 27/00 | (2006.01) | |
| F02B 37/16 | (2006.01) | |
| F01D 17/10 | (2006.01) | |
| F02C 6/12 | (2006.01) | |
| F04D 25/04 | (2006.01) | |
| F01D 9/02 | (2006.01) | |

(52) U.S. Cl.
CPC ........... *F04D 27/009* (2013.01); *F01D 9/026* (2013.01); *F01D 17/105* (2013.01); *F02B 37/164* (2013.01); *F02C 6/12* (2013.01); *F04D 25/04* (2013.01); *F05D 2220/40* (2013.01); *F05D 2250/411* (2013.01); *F05D 2260/606* (2013.01)

(58) Field of Classification Search
CPC ...... F04D 25/04; F02B 37/164; F01D 17/105; F02C 6/12; F05D 2220/40; F05D 2260/606

USPC ........................ 60/602; 417/380; 415/28, 145
See application file for complete search history.

(56) References Cited

U.S. PATENT DOCUMENTS

| | | | | |
|---|---|---|---|---|
| 2,067,984 | A | * | 1/1937 | Ross .......................... F02D 9/00 123/338 |
| 2,648,195 | A | | 8/1953 | Wilde et al. |
| 4,075,849 | A | * | 2/1978 | Richardson ........... F02B 37/183 60/602 |
| 4,404,804 | A | | 9/1983 | Tadokoro et al. |
| 4,656,834 | A | * | 4/1987 | Elpern .................. F02B 37/183 251/68 |

(Continued)

FOREIGN PATENT DOCUMENTS

| | | |
|---|---|---|
| EP | 0 598 174 A1 | 5/1994 |
| EP | 2213865 A2 | 8/2010 |

(Continued)

*Primary Examiner* — Charles Freay
*Assistant Examiner* — Christopher Bobish
(74) *Attorney, Agent, or Firm* — John C. James

(57) ABSTRACT

A turbocharger includes an annular bypass volute to allow exhaust gas to bypass the turbine wheel. An annular bypass valve is disposed in the bypass volute. The bypass valve comprises a fixed annular valve seat and a rotary annular valve member arranged coaxially with the valve seat. The valve member is disposed against the valve seat and is rotatable about the axis for selectively varying a degree of alignment between respective orifices in the valve seat and valve member. The valve member is rotatably driven by a rotary actuator and drive linkage that rotates about an axis parallel to and offset from the axis about which the valve member rotates.

15 Claims, 6 Drawing Sheets

(56) References Cited

U.S. PATENT DOCUMENTS

| | | | |
|---|---|---|---|
| 4,825,523 A * | 5/1989 | Nakazawa | F01D 17/18 164/98 |
| 4,867,637 A | 9/1989 | Hayama | |
| 5,046,317 A * | 9/1991 | Satokawa | F01D 17/105 415/151 |
| 5,146,752 A * | 9/1992 | Bruestle | F01D 17/105 415/164 |
| 5,226,632 A * | 7/1993 | Tepman | F16K 1/10 137/315.27 |
| 5,372,485 A | 12/1994 | Sumser et al. | |
| 5,454,225 A | 10/1995 | Sumser et al. | |
| 5,579,643 A * | 12/1996 | McEwen | F02B 37/025 415/151 |
| 5,855,117 A | 1/1999 | Sumser et al. | |
| 6,374,611 B2 | 4/2002 | Doring et al. | |
| 6,978,615 B2 * | 12/2005 | Jones | F01D 9/026 60/602 |
| 7,010,918 B2 * | 3/2006 | Ruess | F01D 17/105 415/157 |
| 7,249,930 B2 | 7/2007 | Lombard et al. | |
| 7,272,929 B2 * | 9/2007 | Leavesley | F04D 25/04 415/158 |
| 7,458,764 B2 | 12/2008 | Lombard et al. | |
| 8,037,683 B2 * | 10/2011 | Wirbeleit | F01D 17/12 60/602 |
| 8,336,309 B2 * | 12/2012 | McEwan | F01D 17/105 137/601.01 |
| 8,353,664 B2 * | 1/2013 | Lombard | F01D 9/026 415/145 |
| 8,534,994 B2 * | 9/2013 | Lombard | F01D 17/105 415/145 |
| 8,573,929 B2 * | 11/2013 | Lombard | F01D 17/105 415/145 |
| 2003/0029168 A1 | 2/2003 | Hercey et al. | |
| 2005/0091976 A1 | 5/2005 | Whiting | |
| 2007/0122267 A1 | 5/2007 | Lombard et al. | |
| 2007/0169479 A1 | 7/2007 | Nicolle et al. | |
| 2008/0038110 A1 | 2/2008 | Roberts et al. | |
| 2008/0317593 A1 | 12/2008 | Lombard et al. | |
| 2009/0183506 A1 | 7/2009 | Trombetta et al. | |
| 2009/0224190 A1 | 9/2009 | Dale et al. | |
| 2013/0247566 A1 | 9/2013 | Lombard et al. | |

FOREIGN PATENT DOCUMENTS

| | | |
|---|---|---|
| SU | 715812 | 2/1978 |
| WO | WO-2004/074643 | 9/2004 |
| WO | WO-2007/058647 | 5/2007 |

* cited by examiner

TURBOCHARGER WITH AN ANNULAR ROTARY BYPASS VALVE

BACKGROUND OF THE INVENTION

The present disclosure relates to exhaust gas-driven turbochargers, and particularly to turbine arrangements that allow exhaust gas to bypass the turbine under certain engine operating conditions.

In a conventional turbocharger, the turbine housing defines a bypass conduit located generally to one side of the main bore through the housing, and the bypass conduit is connected to the exhaust gas inlet or the volute of the housing via a bypass valve. The bypass valve typically is a swing or poppet style valve comprising a circular valve member that is urged against a flat valve seat surrounding the bypass volute opening. The valve usually is arranged such that the exhaust gas pressure acts on the valve member in a direction tending to open the valve. One drawback associated with such an arrangement is that it is difficult to completely seal the valve in the closed position, since gas pressure tends to open the valve. Leakage past the closed bypass valve is a cause of performance degradation of the turbine and, hence, the turbocharger and its associated engine. The typical solution to the leakage issue is to preload the bypass valve member against the valve seat, but often this does not fully eliminate leakage, and in any event it causes additional problems such as an increase in the required actuation force for opening the valve.

Furthermore, swing or poppet valves tend to be poor in terms of controllability, especially at the crack-open point, and it is common for the bypass flow rate to be highly nonlinear with valve position, which makes it very difficult to properly regulate the bypass flow rate. This leads to problems such as poor transient response of the turbocharger and engine system.

BRIEF SUMMARY OF THE DISCLOSURE

The present disclosure describes various embodiments of turbochargers having a novel bypass arrangement that seeks to address issues such as the ones noted above. In one embodiment, a turbocharger comprises a compressor including a compressor housing, and a turbine including a turbine wheel mounted in a turbine housing. The turbine housing defines at least part of a generally annular chamber extending circumferentially about a longitudinal axis of the turbine housing, and defines a bore extending along the longitudinal axis. A nozzle passage leads from the chamber radially inwardly into the turbine wheel. The turbine housing defines an annular bypass volute surrounding the bore and arranged to allow exhaust gas to bypass the turbine wheel. The turbocharger also includes an annular bypass valve disposed in the bypass volute, the bypass valve comprising a fixed annular valve seat and a rotary annular valve member. The valve member is disposed against the valve seat and is rotatable about the longitudinal axis for selectively varying a degree of alignment between respective orifices defined through each of the valve seat and valve member, ranging from no alignment defining a closed condition of the bypass valve, to at least partial alignment defining an open condition of the bypass valve.

A rotary drive member penetrates through the turbine housing along a drive axis that is generally parallel to and transversely offset from the longitudinal axis about which the valve member rotates, and a drive arm is attached to a distal end of the rotary drive member. A distal end of the drive arm engages the valve member such that rotation of the rotary drive member about the drive axis causes the drive arm to rotate the valve member about the longitudinal axis.

The turbocharger also includes a rotary actuator coupled to the rotary drive member and operable to rotatably drive the rotary drive member about the drive axis.

In one embodiment, the rotary drive member includes a lengthwise section having a substantially greater bending flexibility than that of a remainder of the rotary drive member. Preferably the lengthwise section has the substantially greater bending flexibility about a plurality of axes that are not parallel to the drive axis. This bending flexibility allows a certain degree of angular misalignment between the rotary output shaft of the rotary actuator and the drive arm that drives the valve member.

In one embodiment the flexible lengthwise section of the rotary drive member comprises a bellows. An exemplary embodiment described herein is characterized by the bellows having an integral first hollow cylindrical portion at a first end of the bellows and an integral second hollow cylindrical portion at an opposite second end of the bellows. A first drive shaft is rigidly affixed to the first hollow cylindrical portion (e.g., by inserting the first drive shaft into the first hollow cylindrical portion and welding these parts together) and a second drive shaft is rigidly affixed to the second hollow cylindrical portion (e.g., by a similar welding operation). The first drive shaft is connected to the drive arm and the second drive shaft is connected to the rotary actuator.

In one embodiment, the first drive shaft and the drive arm together constitute a single integral monolithic structure.

Additionally, the second drive shaft can be an output shaft of the rotary actuator.

In addition to being flexible in bending, the bellows is also able to accommodate thermal expansion and contraction along the direction of the rotary drive axis. Furthermore, because the bellows acts like a compression spring along the drive axis, it is possible to axially compress the bellows during assembly (e.g., before welding the bellows to the output shaft of the rotary actuator) so as to create an axial compressive pre-load in the bellows. The pre-load will tend to bias the drive arm and the actuator output shaft axially away from each other. This can have the effect of eliminating undesirable axial gaps or "play" in the linkage.

The turbocharger advantageously includes a bushing mounted in the turbine housing. The bushing defines a passage through which the first drive shaft passes, and an inner surface of the passage constitutes a bearing surface allowing the first drive shaft to rotate about the drive axis.

If desired or required in a particular application, the bushing can define a first mechanical stop for the drive arm to limit rotation of the drive arm in a first direction. Additionally, the bushing can further define a second mechanical stop for the drive arm to limit rotation of the drive arm in a second direction.

In accordance with a further embodiment described herein, a turbocharger comprises a compressor including a compressor housing, and a turbine housing defining an exhaust gas inlet and defining at least part of a generally annular chamber extending circumferentially about a longitudinal axis of the turbine housing, the exhaust gas inlet leading into the chamber, the turbine housing further defining a bore extending along the longitudinal axis; a turbine wheel disposed in the turbine housing; a nozzle leading from the chamber radially inwardly into the turbine wheel; the turbine housing defining an annular bypass volute surrounding the bore and a passage leading from the exhaust gas inlet into the bypass volute, the bypass volute being arranged to allow exhaust gas to bypass the turbine wheel; and an annular bypass valve disposed in the bypass volute. The bypass volute has a non-uniform cross-sectional flow area around a circumference of the bypass volute.

In one embodiment the cross-sectional flow area of the bypass volute has a maximum value where the passage leads from the exhaust gas inlet into the bypass volute, and decreases from that maximum value with increasing circumferential distance away from the passage.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present disclosure now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
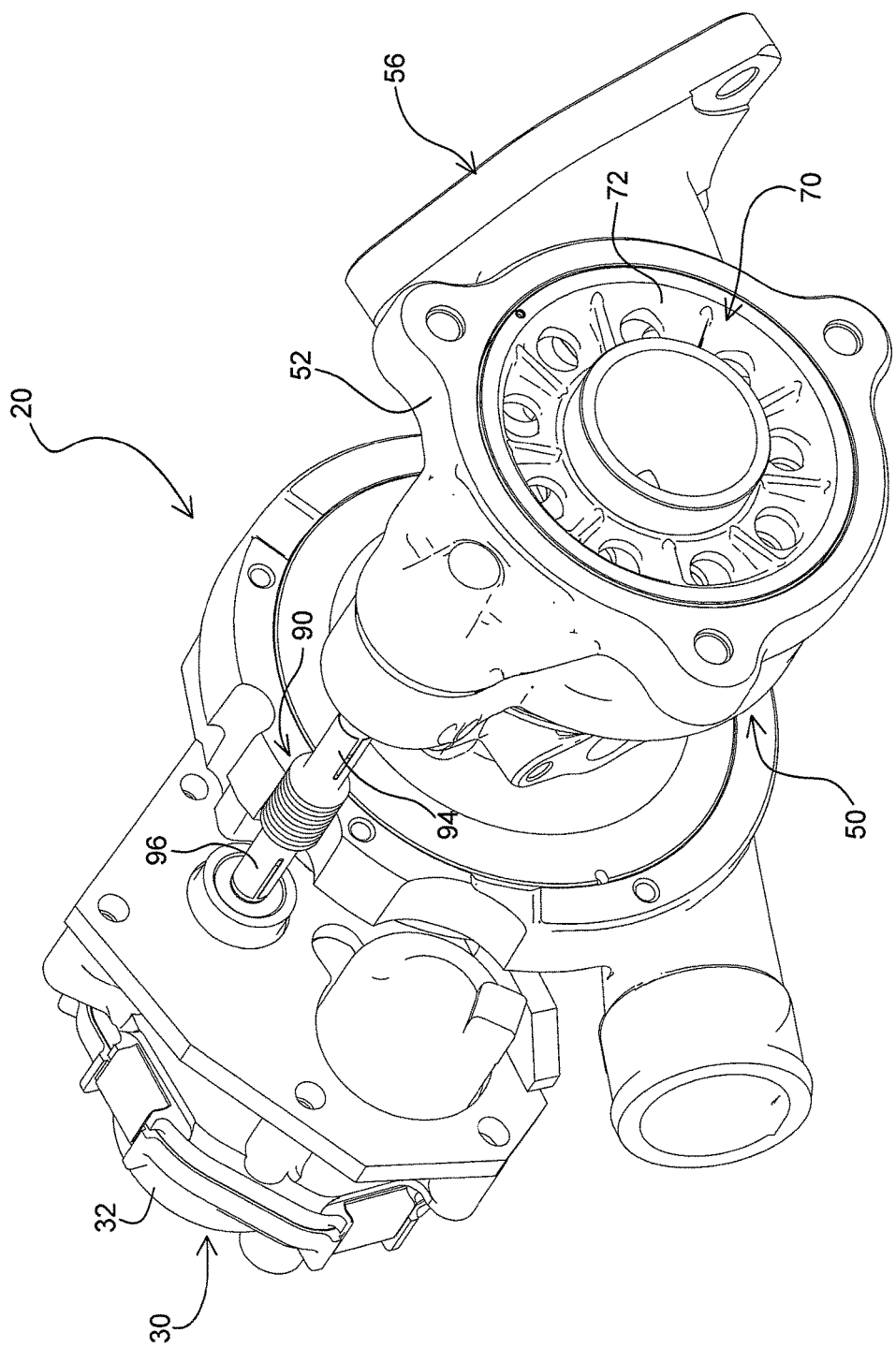
FIG. 1 is perspective view of a turbocharger in accordance with one embodiment of the present invention.
Figure 2:
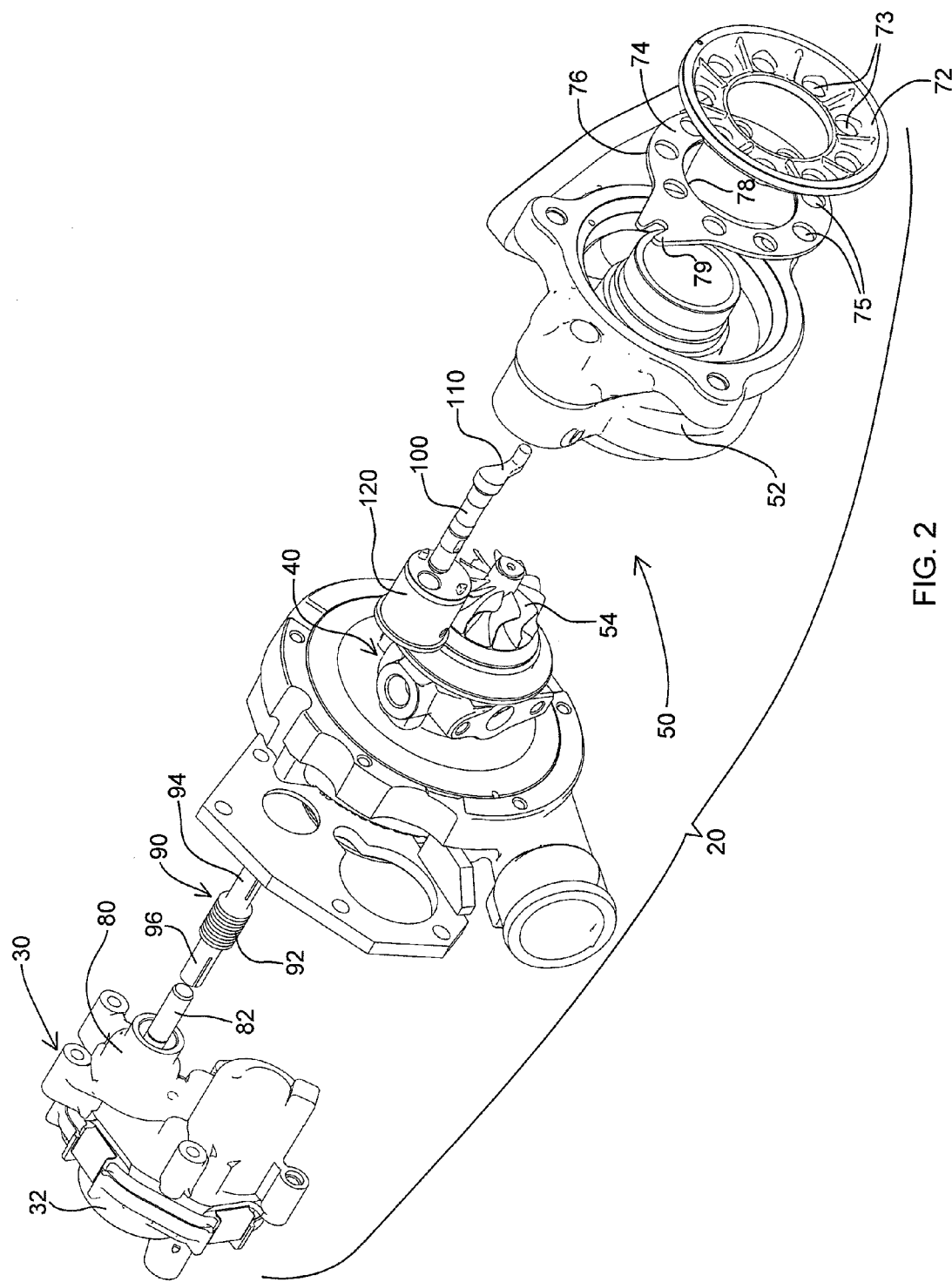
FIG. 2 is an exploded perspective view of the turbocharger of FIG. 1.
Figure 3:
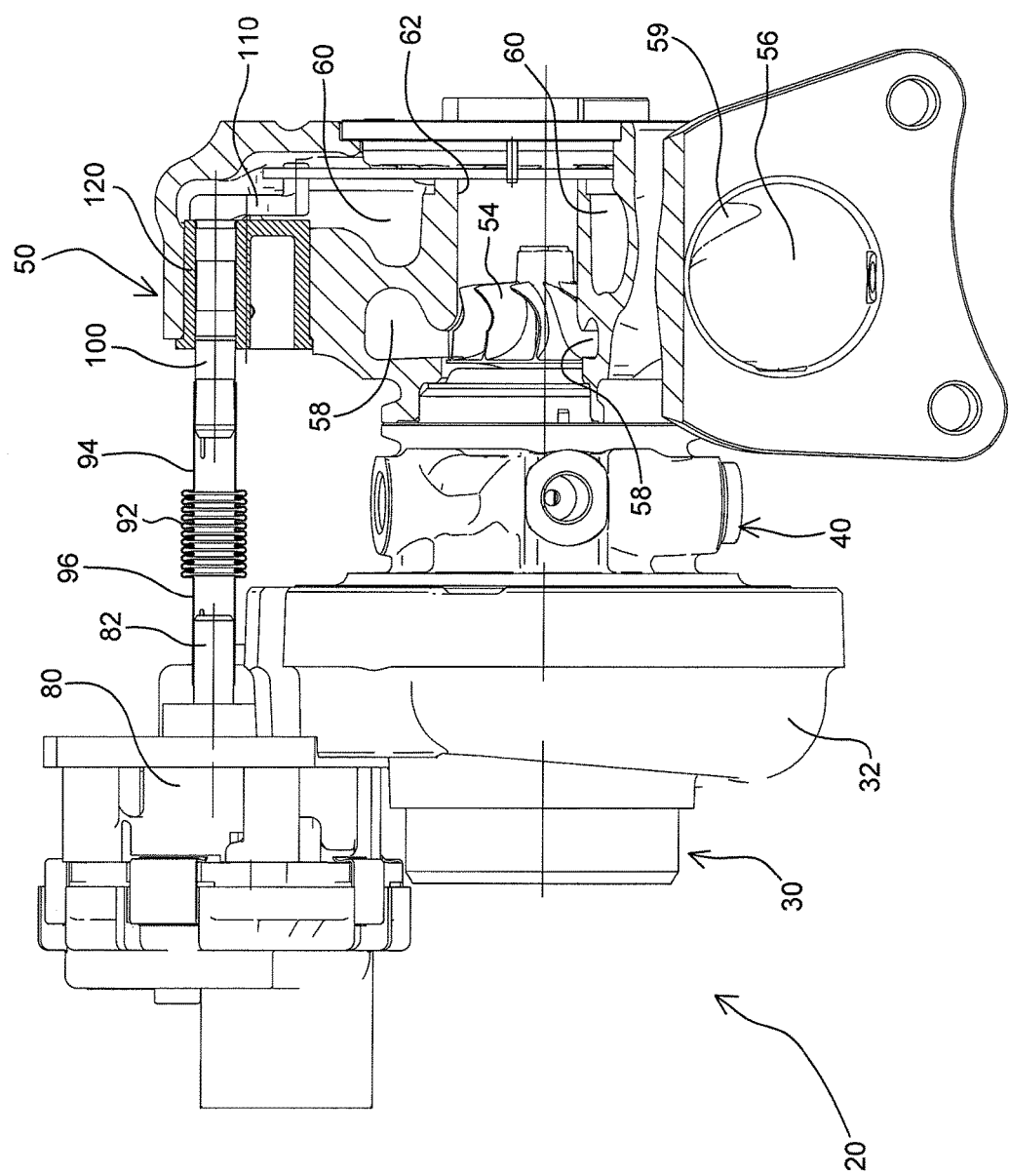
FIG. 3 is a side view of the turbocharger of FIG. 1, partly in section to show internal details in the region of the turbine.

A turbocharger 20 in accordance with one embodiment of the present invention is shown in FIGS. 1 through 3. As shown, major sub-assemblies of the turbocharger 20 include a compressor assembly 30 and a turbine assembly 50. The compressor assembly 30 includes a compressor housing 32 and a compressor wheel (not visible in the drawings) mounted therein and attached to one end of a rotary shaft (not visible). A center housing assembly 40 includes a center housing that is affixed to the compressor housing 32 and that contains bearings for the rotary shaft. The turbine assembly 50 includes a turbine housing 52 and a turbine wheel 54 mounted therein and attached to the opposite end of the rotary shaft.

Figure 4:
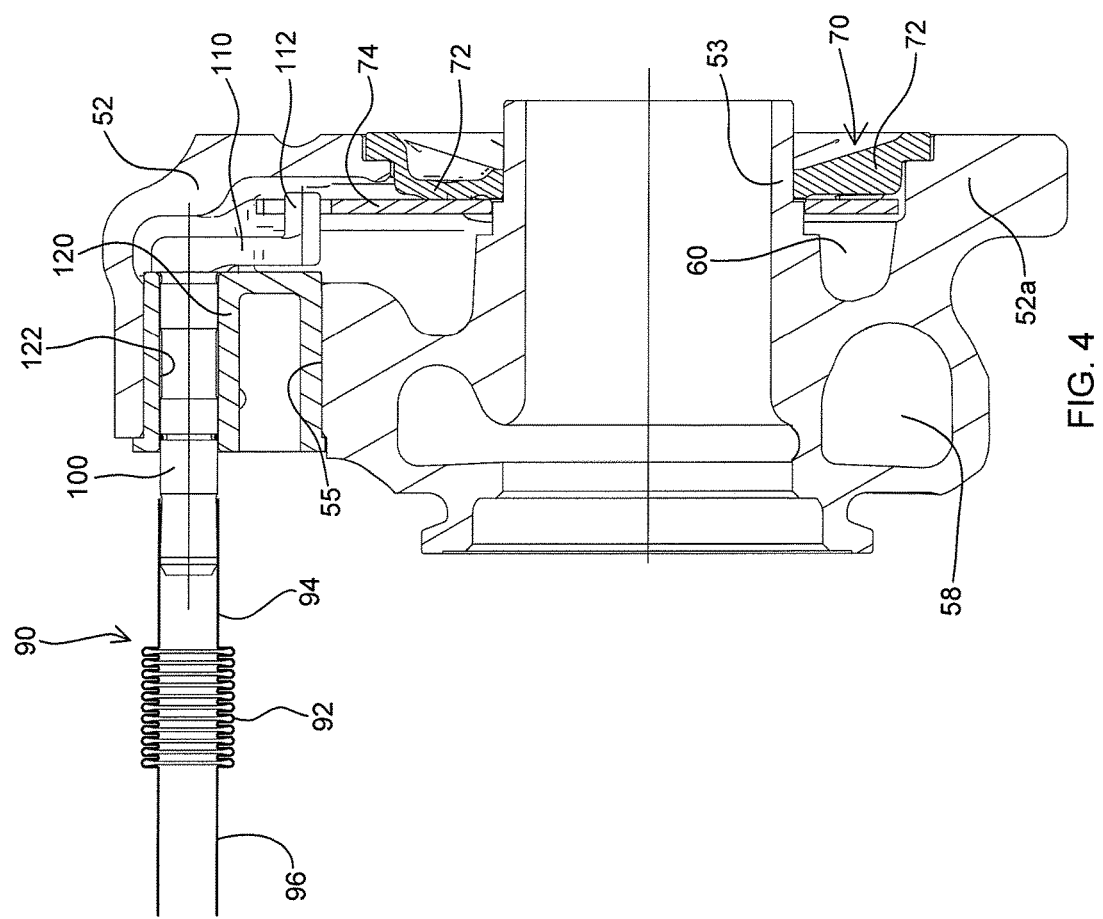
FIG. 4 is an axial cross-sectional view of a turbine housing assembly for the turbocharger of FIG. 1, also showing a bellows drive member affixed to a monolithic drive shaft and drive arm for a bypass valve member.

With particular reference to FIGS. 3 and 4, the turbine housing 52 defines an exhaust gas inlet 56 through which exhaust gas from an internal combustion engine is received, and a volute or annular chamber 58 that receives the exhaust gas from the inlet 56 and distributes the gas around the 360° chamber for feeding into the turbine wheel 54. The exhaust gas inlet 56 is also connected via a connecting passage 59 to a generally annular bypass volute 60 defined in the turbine housing 52. The bypass volute 60 surrounds an axial bore 62 defined in the turbine housing. Exhaust gas that has passed through the turbine wheel 54 is exhausted from the turbine housing through the bore 62. The bypass volute 60 provides an alternative pathway for exhaust gas to flow without first having to pass through the turbine wheel 54. The gas can flow through the bypass volute 60, however, only if the bypass valve described below is open.

With reference to FIGS. 2 and 4, an annular bypass valve 70 is installed in the bypass volute 60 for regulating flow through the bypass volute. The major components of the annular bypass valve 70 include a stationary valve seat 72 and a rotary valve member 74 in abutting engagement with the valve seat. The valve seat 72 and valve member 74 are arranged between an annular outer portion 52a of the turbine housing 52 and an annular inner member 53. The inner member 53 is tubular in form. In the illustrated embodiment the inner member 53 is integral with the rest of the turbine housing, but alternatively the inner member can be a separately formed tubular member that is fitted into the turbine housing. Making the inner member 53 as an integral part of the turbine housing can improve rigidity and robustness of the construction. The valve member 74 is prevented from moving axially upstream (forward) by a tapering part of the outer portion 52a of the turbine housing, although during operation pressure of the exhaust gas urges the valve member 74 in the downstream direction against the valve seat 72. The valve member 74 is not constrained by the turbine housing but is free to rotate about its axis and to move axially against the valve seat 72. The valve seat 72 is prevented from moving axially, radially, or rotationally.

The valve seat 72 (best illustrated in FIG. 2) is a generally flat ring-shaped or annular member having a plurality of orifices 73 circumferentially spaced apart about a circumference of the valve seat, the orifices 73 extending generally axially between the upstream and downstream faces of the valve seat. The orifices 73 in the illustrated embodiment are uniformly spaced about the circumference of the valve seat, but as further described below, non-uniform spacing of the orifices is also possible and can be advantageous in some circumstances. The valve seat 72 can be formed by any of various processes and materials. For example, processes that can be used include casting, casting and machining, and stamping. The illustrated valve seat 72, which includes solid reinforcing ribs between the orifices 73, cannot feasibly be made by a stamping process, but can be made by casting and machining.

The rotary valve member 74 (best illustrated in FIG. 2) is a generally flat ring-shaped or annular member having a plurality of orifices 75 circumferentially spaced apart about a circumference of the valve seat, the orifices 75 extending generally axially between the upstream and downstream faces of the valve member. The orifices 75 in the illustrated embodiment are uniformly spaced about the circumference of the valve member, and the number and spacing of the orifices 75 in the valve member are the same as the number and spacing of the orifices 73 in the valve seat. However, as further described below, non-uniform spacing of the orifices 75 is also possible and can be advantageous in some circumstances; furthermore, the spacings of the orifices 73 and 75 do not have to be the same, and in some cases it can be advantageous for the spacings to be different. The valve member 74 has a substantially circular outer edge 76 and a substantially circular inner edge 78, the outer and inner edges 76, 78 being coaxial with respect to a central longitudinal axis of the valve member, which axis is also substantially coincident with a central longitudinal axis of the valve seat 72. The outer portion 52a of the turbine housing and the inner member 53 both define substantially circular bearing surfaces for the outer and inner edges 76, 78 of the rotary valve member 74 and there are clearances therebetween, so that the valve member can be rotated in one direction or the opposite direction about its central longitudinal axis in order to vary a degree of alignment between the valve member orifices 75 and the valve seat orifices 73, as further described below.

With reference to FIGS. 2 through 6, rotation of the valve member 74 is accomplished by a rotary actuator 80 having an output shaft 82 that is connected to one end of a rotary drive member 90. Connected to the opposite end of the drive member 90 is a drive shaft 100. The output shaft 82, rotary drive member 90, and drive shaft 100 are generally collinear, having a common axis, referred to herein as the drive axis, that is parallel to and transversely offset from the longitudinal axis about which the valve member 74 rotates. A drive arm 110 is connected to the drive shaft 100. The drive arm 110 is generally "L"-shaped, having a portion that extends generally perpendicular to the drive axis, and a distal end (i.e., the end remote from the end that is connected to the drive shaft 100) that defines a pin or rod portion 112 that extends generally parallel to the drive axis. The valve member 74 includes a fork 79 that receives the pin portion 112 of the drive arm 110. Rotation of the rotary actuator's output shaft 82 causes the drive member 90 to rotate about the drive axis, which causes the drive shaft 100 to rotate and therefore the distal end of the drive arm 110 sweeps through an arc, thereby causing the valve member 74 to rotate about its longitudinal axis. Thus, rotation of the actuator in one direction will rotate the valve member in a first direction (opposite to that of the actuator), and rotation of the actuator in the other direction will cause the valve member to rotate in a second direction.

In accordance with an embodiment of the invention, as illustrated in the figures, the rotary drive member 90 can include a lengthwise section whose bending flexibility is substantially greater than that of the remaining portions of the drive member. The bending flexibility preferably is substantially greater about multiple axes that are not parallel to the drive axis about which the drive member rotates to impart movement to the drive arm 110. In one embodiment, as shown, the section of greater flexibility is a bellows 92. The drive member 90 is preferably formed of a resilient metal such that the bellows 92 can act as a spring in axial compression and will also return to a straight (i.e., unbent) condition after any bending force is removed. The rotary drive member has an integral first hollow cylindrical portion 94 at a first end of the bellows 92, and an integral second hollow cylindrical portion 96 at an opposite second end of the bellows. The drive shaft 100 is rigidly affixed to the first hollow cylindrical portion 94 and the actuator output shaft 82 is rigidly affixed to the second hollow cylindrical portion 96. For example, each of the shafts 82 and 100 can be inserted into the respective hollow cylindrical portions and can be welded in place.

As noted, the bellows 92 can act like a compression spring along the drive axis. This can be used to advantage for taking up any axial play in the linkage between the actuator 80 and the drive arm 110. Accordingly, the bellows can be axially compressed so as to create an axial compressive pre-load in the bellows. For example, with reference to FIG. 3, with the turbocharger substantially assembled and the hollow cylindrical portion 94 already welded to the drive shaft 100 but the other hollow cylindrical portion 96 not yet welded to the actuator output shaft 82, the bellows 92 can be axially compressed by a determined amount, and then the hollow cylindrical portion 96 can be welded to the actuator output shaft 82.

Figure 5:
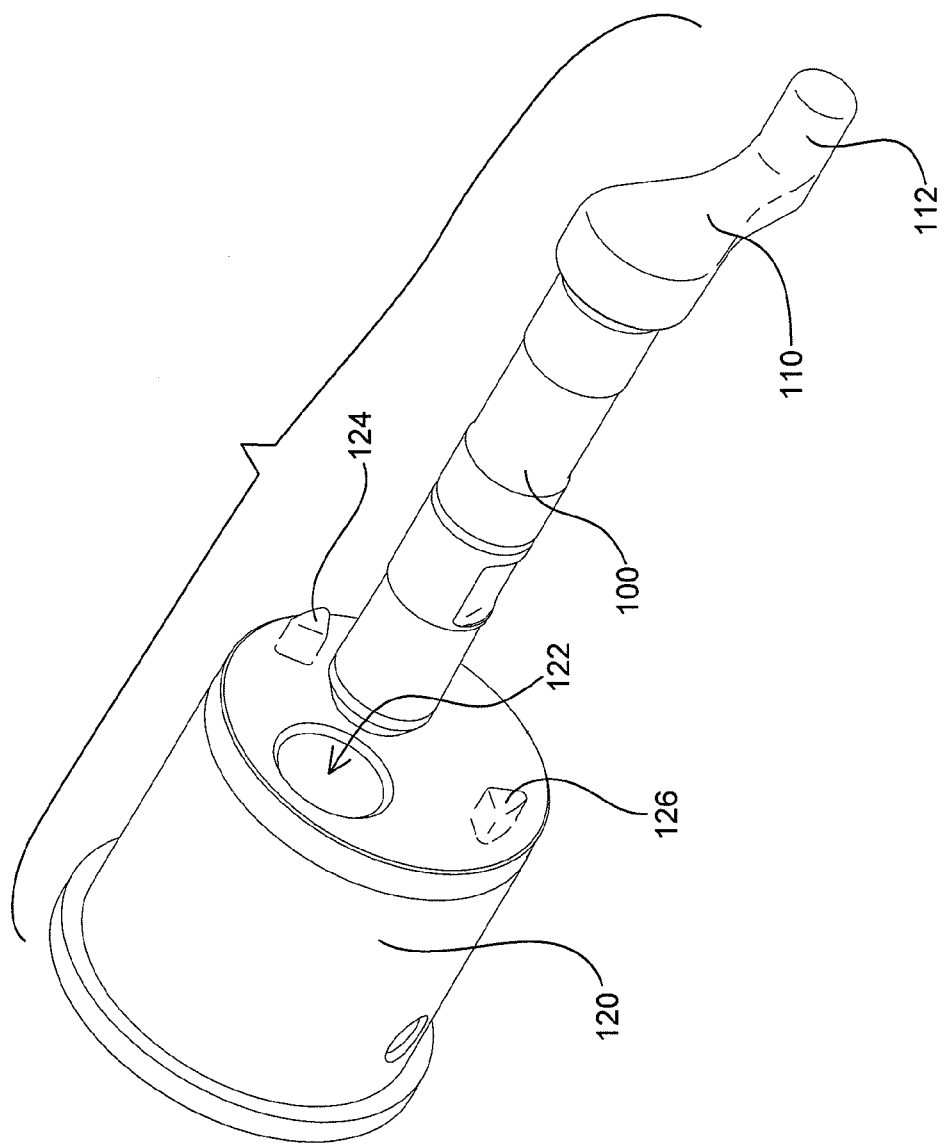
FIG. 5 is an exploded perspective view of a bushing and a monolithic drive shaft and drive arm in accordance with one embodiment.

With reference to FIGS. 3 through 5, the turbocharger includes a bushing 120 for the drive shaft 100. The bushing is installed in a cavity 55 defined in the turbine housing 52. The bushing defines a through passage 122 for the drive shaft 100. The through passage 122 has a cylindrical inner surface of a diameter sized to fit closely about the drive shaft 100 while still allowing the drive shaft to freely rotate about the axis defined by the inner surface. An end of the drive shaft 100 extends out the end of the through passage 122 and connects to the drive arm 110.

With reference to FIG. 4, it will be appreciated that because the drive arm 110 is oriented substantially radially and rotates about the drive axis at the radially outer end of the drive arm, for a given angular rotation of the drive shaft 100, the radially inner or distal end of the drive arm swings through an arc whose circumferential extent is related to the radial distance between the drive axis and the distal end of the drive arm, but is not related to the axial length of the pin 112. In other words, the drive arm 110 can occupy a short axial length without compromising the ability to achieve the desired circumferential movement range of the pin 112. This is not true of an arrangement such as shown in Applicant's U.S. Pat. No. 8,353,664 issued on Jan. 15, 2013 . With reference to FIG. 1 of that patent, because the drive member 100 rotates about an axis that is radial, for a given angular rotation of the drive member 100 the circumferential extent of movement of the end of the attached drive arm 90 is related directly to the axial length of the arm 90. Thus, the drive arm cannot be reduced in axial length below a certain value or else an inadequate amount of movement of the drive arm would result. In contrast, the arrangement described and claimed herein can enable an axial length reduction of the drive arm 110 and consequently an axial length reduction of the turbine housing.

In one embodiment, the drive shaft 100 and drive arm 110 together constitute a single integral, monolithic part. Thus, the drive shaft is configured so that it can be inserted (right-to-left in FIG. 3) through the passage 122 of the bushing 120, after which the end of the drive shaft is affixed to one end of the drive member 90. The opposite end of the drive member 90 is affixed to the output shaft 82 of the actuator 80.

Figure 6:
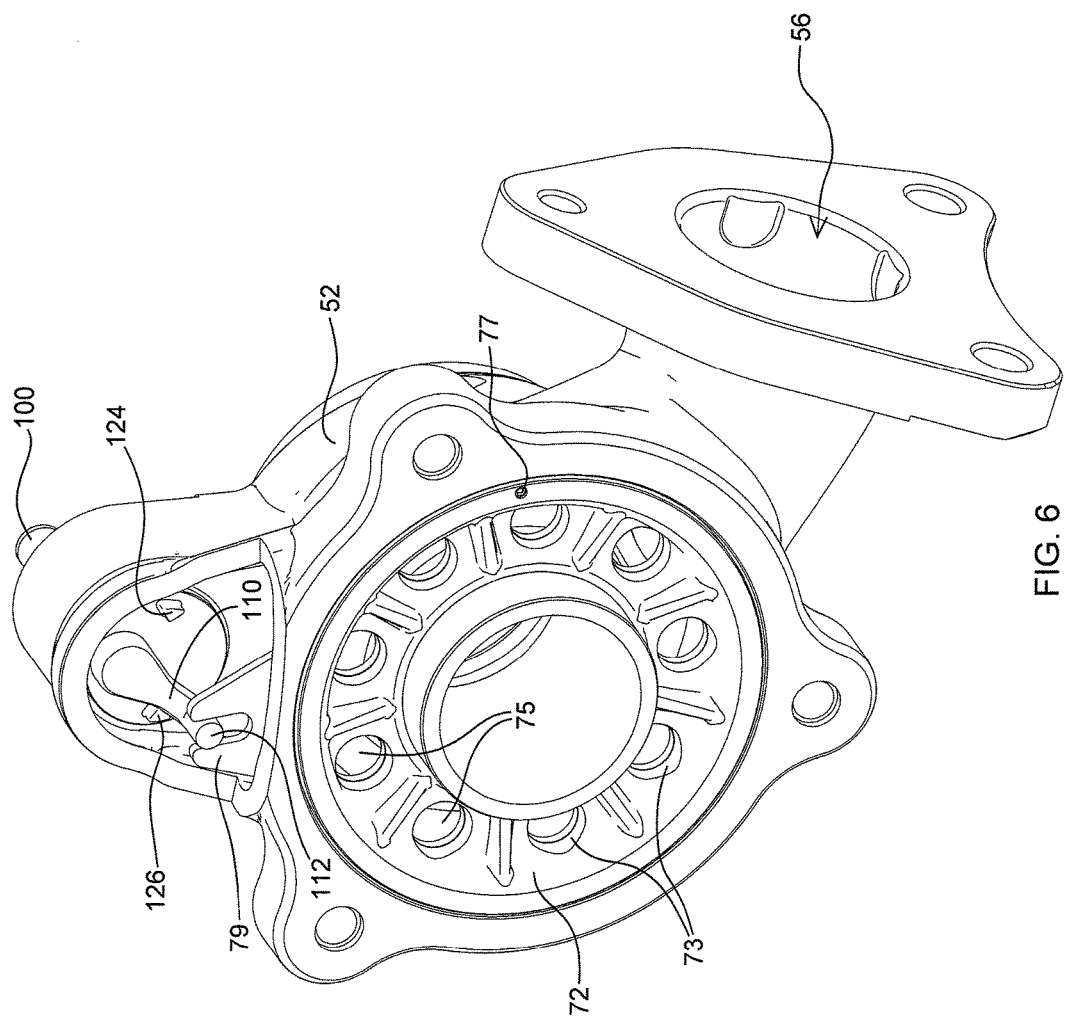
FIG. 6 is a perspective view of the turbocharger of FIG. 1, with a portion of the turbine housing broken away to show the connection between the drive arm and the rotary valve member.

The bushing 120 can define one or two mechanical stops for the drive arm 110. Thus, as shown in FIGS. 5 and 6, a mechanical stop 124 is defined on the end face of the bushing 120 for limiting the rotation of the drive arm in a counterclockwise direction of those figures. An additional mechanical stop 126 is defined for limiting the rotation of the drive arm in the clockwise direction. FIG. 6 shows the arm 110 against the stop 126, which may define, for example, the fully open position of the bypass valve 70. The stop 124 may define the fully closed position.

With reference to FIG. 3, a further feature of the invention is now described. It will be seen that the bypass volute 60 does not have a uniform cross-sectional flow area around the circumference of the volute. Rather, the bypass volute 60 has a non-uniform cross-sectional flow area characterized by a maximum flow area where the passage 59 leads from the inlet 56 into the bypass volute 60, and the flow area decreases from that maximum with increasing circumferential distance away from the passage 59. It will also be noted that the bypass volute 60 has a relatively small flow area at circumferential locations where the main volute 58 has a relatively large flow area, and has a relatively large flow area at circumferential locations where the main volute 58 has a relatively small flow area. The non-uniform flow area of the bypass volute 60 may allow substantially the same flow velocity at each of the bypass valve orifices.

In operation, bypass flow regulation in the turbocharger of FIGS. 1 through 6 is accomplished by rotation of the rotary actuator 80, which changes the position of the bypass valve 70. The valve 70 can be configured such that it is normally closed, i.e., there is no overlap between the valve seat orifices 73 and the valve member orifices 75. The valve then begins to open only when the orifices 73, 75 begin to overlap as the actuator 80 rotates the valve member 74. Alternatively, the valve can be configured such that it is normally open, and rotation by the actuator moves the valve toward its closed position. In accordance with present disclosure, changing from a normally open to a normally closed valve configuration can be accomplished simply by rotating the valve seat 72 to the desired position and then fixing it in that position, for example by a set screw 77 (FIG. 6).

With the described annular bypass valve 70, exhaust gas pressure acts on the valve member 74 in a direction toward the fixed valve seat 72, thereby tending to improve sealing between the valve member and valve seat. Furthermore, the gas pressure does not tend to open the valve, in contrast to the aforementioned swing and poppet style bypass valve arrangements in which gas pressure acts in a direction tending to open the valve and cause leakage. The improved sealing made possible by the valve is thought to be significant because it can improve the transient response time of the turbocharger, by making better use of instantaneous engine pulses in the exhaust gas stream, especially at low engine speeds and gas flow rates where the pulse impact is most significant in regard to turbine efficiency.

A further advantage is that the valve 70 can achieve better controllability than is typically possible with swing or poppet valves, particularly at the crack-open point. In particular, the evolution of the shape and size of the flow passages through the valve as the valve member 74 is rotated can be tailored to the needs of a particular application simply by suitably configuring the sizes, angular locations (e.g., whether uniformly or non-uniformly spaced apart), and shapes of the orifices in the valve member and valve seat. Thus, while the orifices 73, 75 are shown as being circular in the drawings, alternatively they can be made non-circular as a way of altering the evolution of the flow passages as the valve opens. For example, the orifices could be made generally rectangular with their edges extending generally radially (possibly with a larger dimension in the radial direction than in the circumferential direction), which would result in a greater change in flow passage size per degree of valve member rotation, in comparison with the circular orifice shape.

As another example of the fine-tuning of the evolution of the valve flow passages made possible by the invention, the valve seat orifices 73 could have a first circumferential spacing (e.g., uniform) about the circumference, and the valve member orifices 75 could have a second circumferential spacing (e.g., non-uniform) different from the first circumferential spacing. It is further possible (though not essential) in such an embodiment for the orifices in the valve member to be of different sizes and/or shapes from the orifices in the valve seat. This could result in, for example, one flow passage (or some other subset of the total number of flow passages) beginning to open before any of the other flow passages begin to open, thereby achieving a very gradual cracking open of the bypass valve. Further rotation of the valve member would then cause the other flow passages to open (perhaps in a sequential or staged fashion, e.g., one flow passage opening at a time until finally all flow passages are open). These are merely some examples of the many different ways the orifices can be configured so as to achieve a desired flow passage evolution as a function of valve member rotation.

In accordance with the present disclosure, the rotary actuator 80 can be an electric actuator. The inline axial orientation of the rotary actuator and drive linkage enables a particularly compact arrangement of the turbocharger 20 relative to prior turbochargers employing pneumatic linear actuators whose linkage by necessity extended transversely to the turbocharger axis in order to convert the linear actuator movement into a rotation of the bypass valve member. A further advantage of the arrangement disclosed herein is the substantial elimination of free play in the kinematic chain between the actuator and the bypass valve member. This in turn means that the position of the actuator output shaft is well-correlated with the position of the valve member, which facilitates the accurate sensing and control of the bypass valve position.

The elimination of play may be further helped, in accordance with another embodiment, by ensuring that the pin 112 of the drive arm 110 is always abutting one of the legs of the fork 79 (see FIG. 6). It will be appreciated that it is not possible to make the width of the fork exactly the same as the diameter of the pin 112 and therefore there will generally be some amount of play in this connection. By ensuring that the pin is always held against just one of the legs, however, the play is taken out. This can be done in various ways. As one example, a suitable clip (not shown) can connect the pin to the leg and keep them in abutting contact. As another option, a vane (not shown) of suitable configuration can be provided on the valve member 74 for creating an aerodynamic loading from the exhaust gases so as to always urge the valve member in a rotational direction to keep one of the legs of the fork against the pin.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger comprising:
 a compressor including a compressor housing;
 a turbine housing defining at least part of a generally annular chamber extending circumferentially about a longitudinal axis of the turbine housing, the turbine housing defining a bore extending along the longitudinal axis;
 a turbine wheel disposed in the turbine housing;
 a nozzle passage leading from the chamber radially inwardly into the turbine wheel;
 the turbine housing defining an annular bypass volute surrounding the bore and arranged to allow exhaust gas to bypass the turbine wheel;
 an annular bypass valve disposed in the bypass volute, the bypass valve comprising a fixed annular valve seat and a rotary annular valve member, the valve member being disposed against the valve seat and being rotatable about the longitudinal axis for selectively varying a degree of alignment between respective orifices defined through each of the valve seat and valve member, ranging from no alignment defining a closed condition of the bypass valve, to at least partial alignment defining an open condition of the bypass valve;

a rotary drive member penetrating through the turbine housing along a drive axis that is generally parallel to and transversely offset from the longitudinal axis about which the valve member rotates, wherein the rotary drive member includes a lengthwise section comprising a bellows having a substantially greater bending flexibility than that of a remainder of the rotary drive member, and a drive arm attached to a distal end of the rotary drive member, a distal end of the drive arm engaging the valve member such that rotation of the rotary drive member about the drive axis causes the drive arm to rotate the valve member about the longitudinal axis; and a rotary actuator coupled to the rotary drive member and operable to rotatably drive the rotary drive member about the drive axis for rotating the valve member.

2. The turbocharger of claim 1, wherein the lengthwise section has the substantially greater bending flexibility about a plurality of axes that are not parallel to the drive axis.

3. The turbocharger of claim 1, wherein the rotary drive member has an integral first hollow cylindrical portion at a first end of the bellows and an integral second hollow cylindrical portion at an opposite second end of the bellows, and further comprising a first drive shaft rigidly affixed to the first hollow cylindrical portion and a second drive shaft rigidly affixed to the second hollow cylindrical portion, wherein the first drive shaft is connected to the drive arm and the second drive shaft is connected to the rotary actuator.

4. The turbocharger of claim 3, wherein the bellows acts like a compression spring along the drive axis, and the bellows is axially compressed so as to create an axial compressive pre-load in the bellows.

5. The turbocharger of claim 3, wherein the first drive shaft and the drive arm together constitute a single integral monolithic structure.

6. The turbocharger of claim 3, wherein the second drive shaft is an output shaft of the rotary actuator.

7. The turbocharger of claim 3, further comprising a bushing mounted in the turbine housing, the bushing defining a passage through which the first drive shaft passes, an inner surface of the passage constituting a bearing surface allowing the first drive shaft to rotate about the drive axis.

8. The turbocharger of claim 7, wherein the bushing defines a first mechanical stop for the drive arm to limit rotation of the drive arm in a first direction.

9. The turbocharger of claim 8, wherein the bushing further defines a second mechanical stop for the drive arm to limit rotation of the drive arm in a second direction.

10. The turbocharger of claim 1, the valve member defining a plurality of first orifices therethrough, the valve seat defining a plurality of second orifices therethrough, and each first orifice having a corresponding second orifice.

11. The turbocharger of claim 10, the first orifices having a first circumferential spacing therebetween and the second orifices having a second circumferential spacing therebetween, wherein the first circumferential spacing is different from the second circumferential spacing, and wherein at least partial alignment between one of the first orifices and a corresponding one of the second orifices creates a flow passage for flow of exhaust gas therethrough, rotation of the valve member about the axis causing variation in a degree of alignment between the first orifices defined through the valve member and the second orifices defined through the valve seat, ranging from no alignment defining a closed condition of the bypass valve, to at least partial alignment defining an open condition of the bypass valve.

12. The turbocharger of claim 11, wherein the first and second orifices are configured and arranged such that one subset of all flow passages begins to open before any of the other flow passages begin to open.

13. The turbocharger of claim 12, wherein the first and second orifices are configured and arranged such that one flow passage opens at a time, until finally all flow passages are open.

14. The turbocharger of claim 1,
wherein the bypass volute has a non-uniform cross-sectional flow area around a circumference of the bypass volute.

15. The turbocharger of claim 14, wherein the cross-sectional flow area of the bypass volute has a maximum value where the passage leads from the exhaust gas inlet into the bypass volute, and decreases from that maximum value with increasing circumferential distance away from the passage.

* * * * *